United States Patent [19]

Engle

[11] Patent Number: 5,217,657
[45] Date of Patent: * Jun. 8, 1993

[54] METHOD OF MAKING CARBON-CARBON COMPOSITES

[76] Inventor: Glen B. Engle, 16716 Martincoit Rd., Poway, Calif. 92064

[*] Notice: The portion of the term of this patent subsequent to Oct. 29, 2008 has been disclaimed.

[21] Appl. No.: 783,577

[22] Filed: Oct. 28, 1991

Related U.S. Application Data

[63] Continuation-in-part of Ser. No. 402,453, Sep. 5, 1989, Pat. No. 5,061,414.

[51] Int. Cl.$^5$ .................. B29C 43/18; C01B 31/04
[52] U.S. Cl. .................. 264/29.5; 264/81; 264/103; 264/105; 264/137; 264/294; 423/447.4; 423/447.8; 423/448; 423/449.1; 427/189; 427/191; 427/203; 427/227; 427/228; 427/249
[58] Field of Search ............ 264/29.1, 29.5, 29.7, 264/81, 103, 105, 137, 294; 156/89, 148, 155, 242, 245; 427/189, 190, 191, 192, 203, 227, 228, 249; 423/447.4, 447.8, 448, 449

[56] References Cited

U.S. PATENT DOCUMENTS

| | | | |
|---|---|---|---|
| 3,895,084 | 7/1975 | Bauer | 264/29.1 X |
| 3,914,395 | 10/1975 | Finelli et al. | 423/448 |
| 4,131,708 | 12/1978 | Moores et al. | 427/228 X |
| 4,178,413 | 12/1979 | DeMunda | 264/29.5 X |
| 4,201,611 | 5/1980 | Stover | 156/155 |
| 4,318,955 | 3/1982 | Kulakov et al. | 264/29.5 X |
| 4,400,421 | 8/1983 | Stover | 428/113 |
| 4,515,847 | 5/1985 | Taverna et al. | 264/29.5 X |
| 4,522,883 | 6/1985 | Wallace et al. | 423/447.4 X |
| 4,554,024 | 11/1985 | Zimmer et al. | 427/227 X |
| 4,613,522 | 9/1986 | Vasilos | 427/203 X |
| 4,766,013 | 8/1988 | Warren | 427/228 |

OTHER PUBLICATIONS

Rubin, L. "High Modulus Carbon Fiber Based C/C for Space Applications", Jul. 18, 1986.
Booth, R. E. "Thermal, Mechanical and Physical Properties of C/C Composites Containing P-100 Pitch-Based Fibers", Jan. 18-20, 1989.

*Primary Examiner*—Leo B. Tentoni
*Attorney, Agent, or Firm*—John R. Ross

[57] ABSTRACT

A process for making 2D and 3D carbon-carbon composites having a combined high crystallinity, high strength, high modulus and high thermal and electrical conductivity. High-modulus/high-strength mesophase derived carbon fibers are woven into a suitable cloth. Layers of this easily graphitizible woven cloth are infiltrated with carbon material to form green composites. The carbonized composite is then impregnated several times with pitch by covering the composite with hot pitch under pressure. The composites are given a heat treatment between each impregnant step to crack up the infiltrated carbon and allow additional pitch to enter the microstructure during the next impregnation cycle. The impregnated composites are then given a final heat treatment in the range 2500° to 3100° C. to fully graphitize the fibers and the matrix carbon. The composites are then infiltrated with pyrolytic carbon by chemical vapor deposition in the range 1000° C. to 1300° C. at a reduced pressure.

22 Claims, 14 Drawing Sheets

METHOD OF MAKING CARBON-CARBON COMPOSITES

This invention was made with government support under various contracts awarded through the Department of Energy. The government has certain rights in this invention.

This application is a continuation-in-part of Ser. No. 07/402,453, Method of Making Carbon-Carbon Composites, filed Sep. 5, 1989 soon to issue as U.S. Pat. No. 5,061,414 with an issue date of Oct. 29, 1991.

This invention relates to carbon-carbon composites and in particular to highly graphitic and high-strength, high-modulus and high thermal and electrical conducting carbon-carbon composites.

BACKGROUND OF THE INVENTION

Carbon-carbon composites are available which have many advantages over other materials. Conventional carbon-carbons are nongraphitic and relatively strong. Some applications require a combination of high crystallinity, high strength, high modulus and high thermal and electrical conductivity.

SUMMARY OF THE INVENTION

The present invention provides a process for making 2D and 3D carbon-carbon composites having a combined high crystallinity, high strength, high modulus and high thermal and electrical conductivity. High-modulus/high-strength mesophase derived carbon fibers are woven into a suitable cloth. Layers of this easily graphitizible woven cloth are infiltrated with carbon material to form green composites. The carbonized composite is then impregnated several times with pitch by covering the composite with hot pitch under pressure. The composites are given a heat treatment between each impregnant step to crack up the infiltrated carbon and allow additional pitch to enter the microstructure during the next impregnation cycle. The impregnated composites are then given a final heat treatment in the range 2500° to 3100° C. to fully graphitize the fibers and the matrix carbon. The composites are then infiltrated with pyrolytic carbon by chemical vapor deposition in the range 1000° to 1300° C. at a reduced pressure.

DESCRIPTION OF PREFERRED EMBODIMENT

Figure 1:
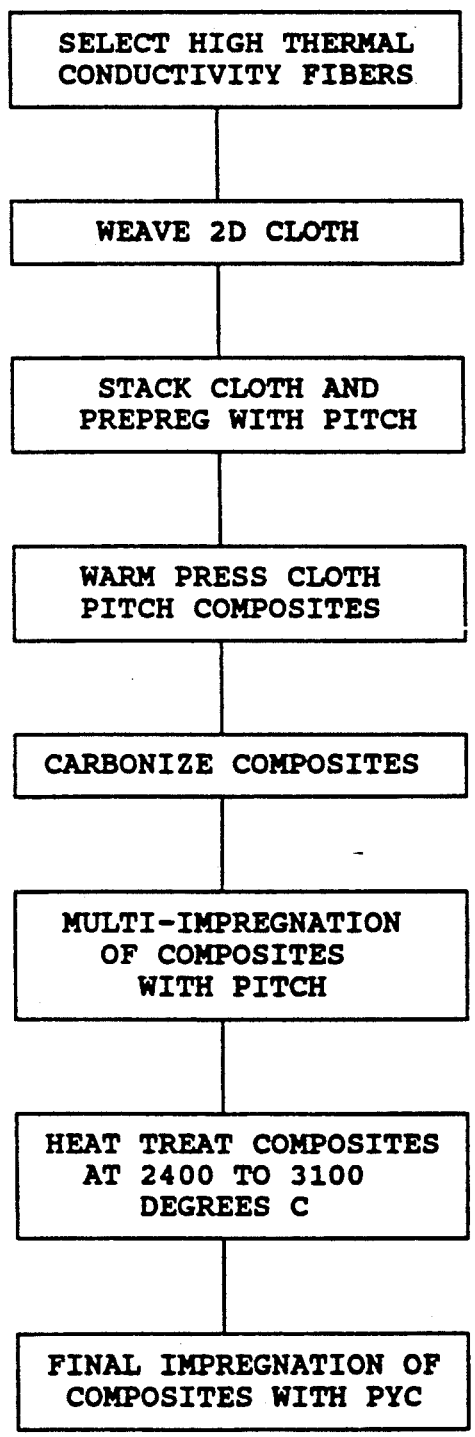
FIGS. 1-14 are all flow diagrams describing various preferred embodiments of the present invention.
Figure 2:
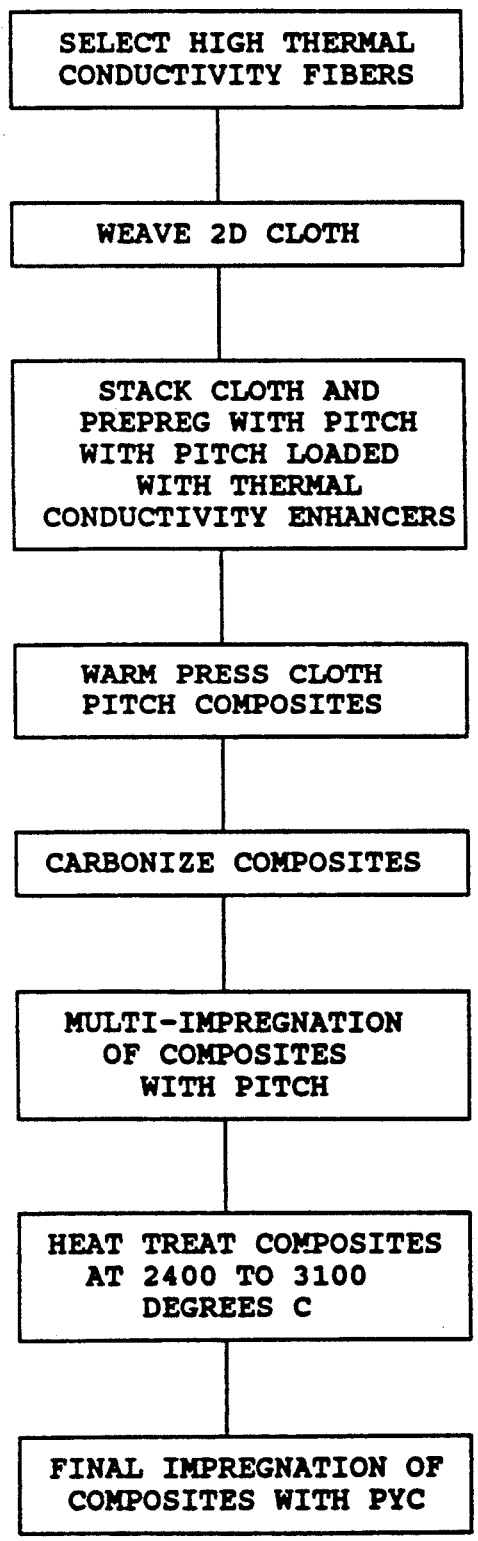
Figure 3:
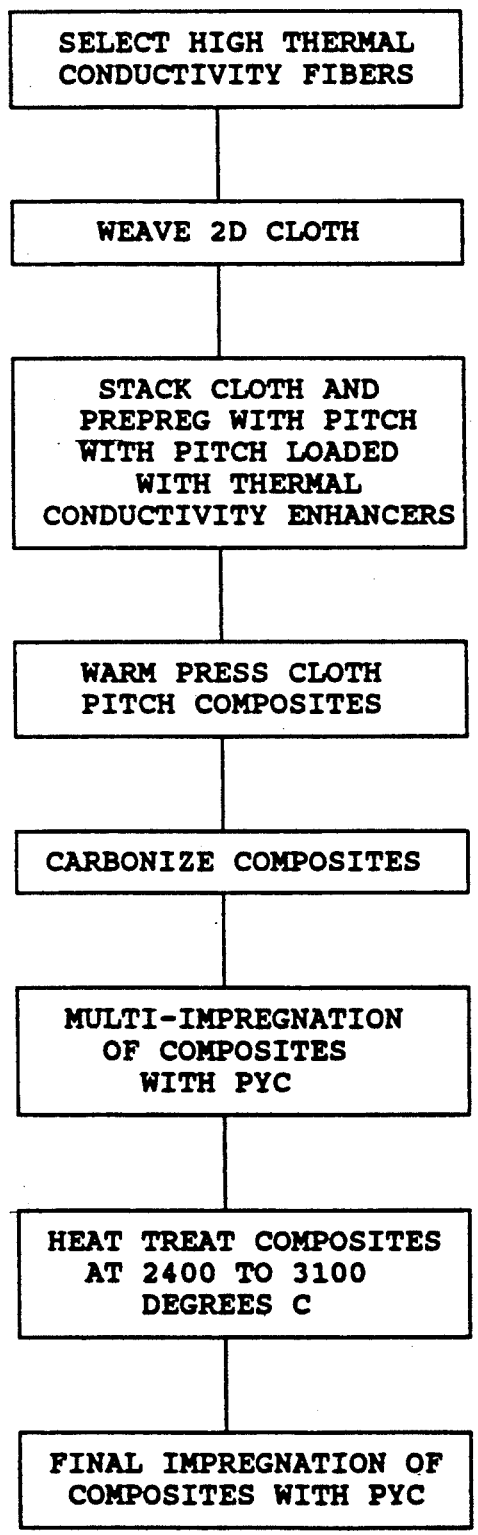
Figure 4:
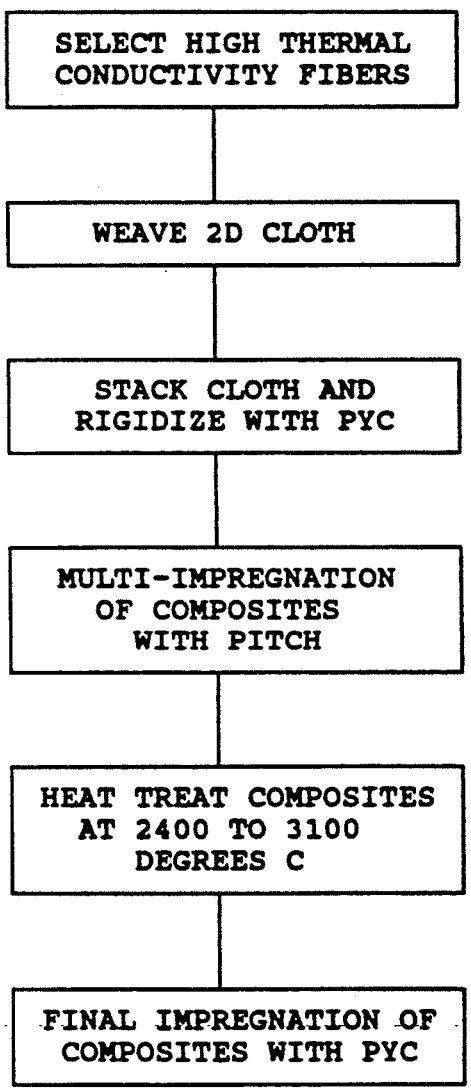
Figure 5:
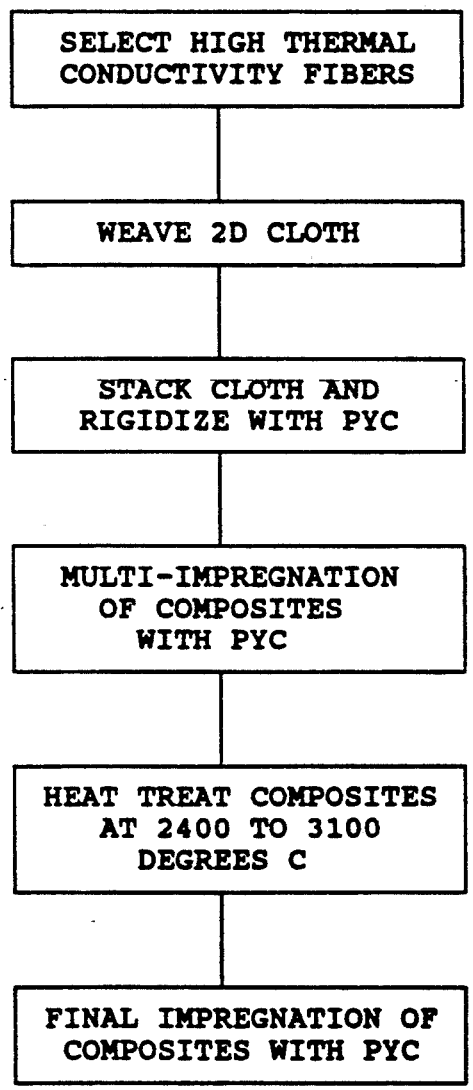
Figure 6:
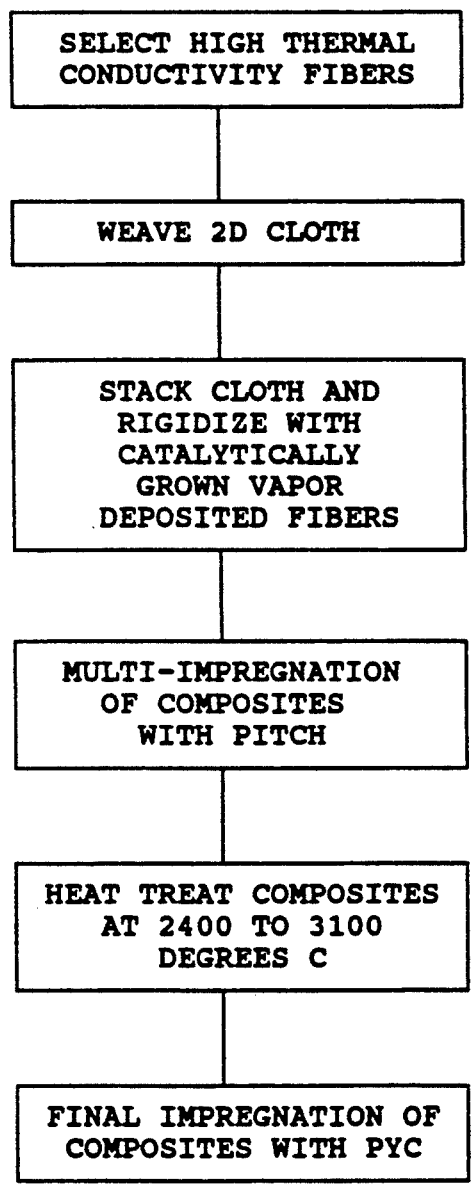
Figure 7:
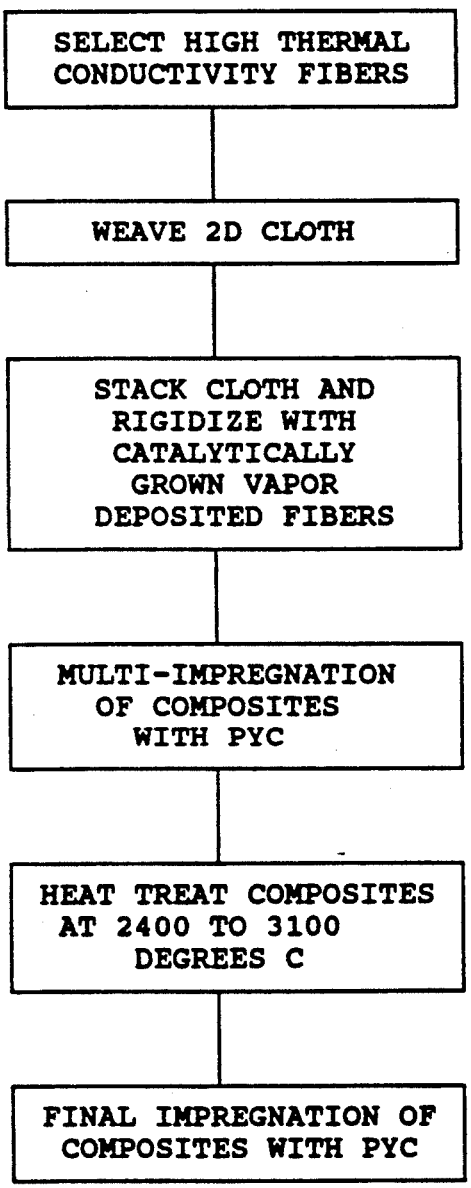
Figure 8:
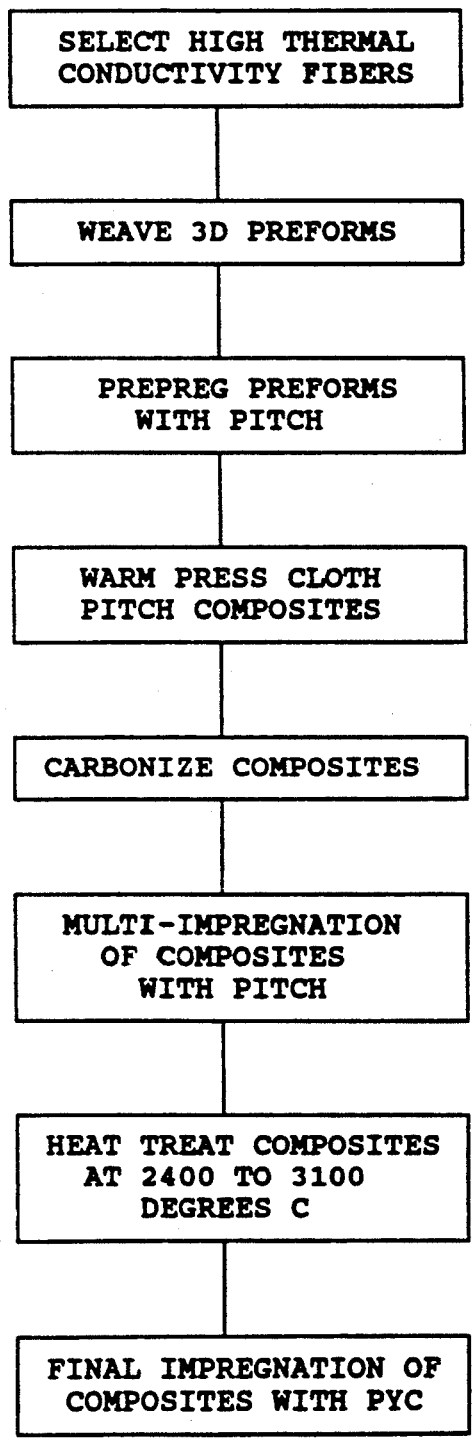
Figure 9:
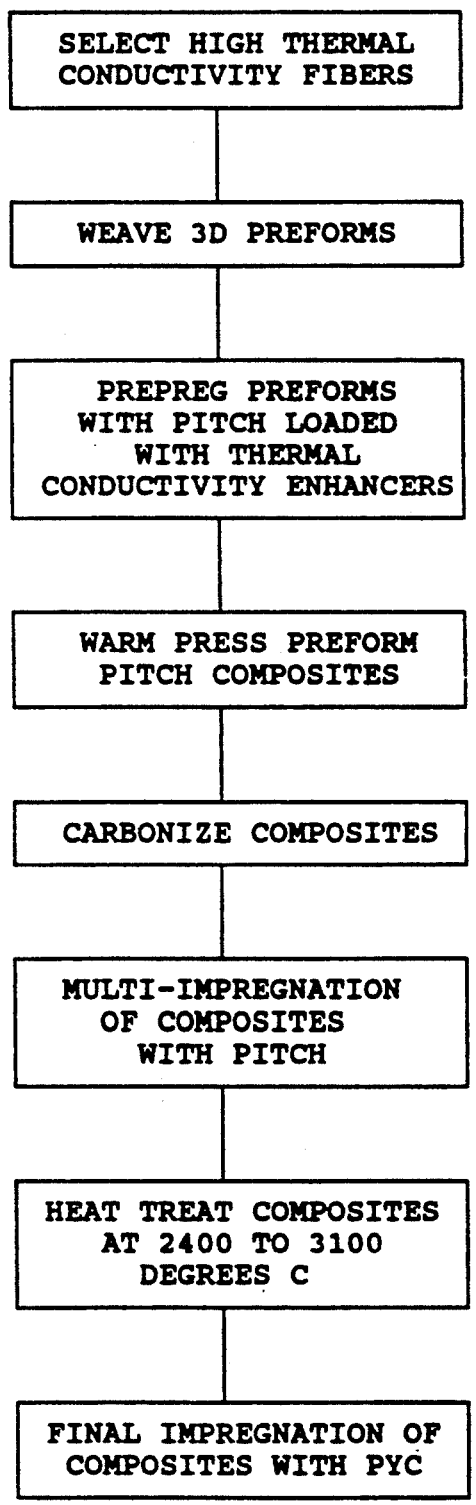
Figure 10:
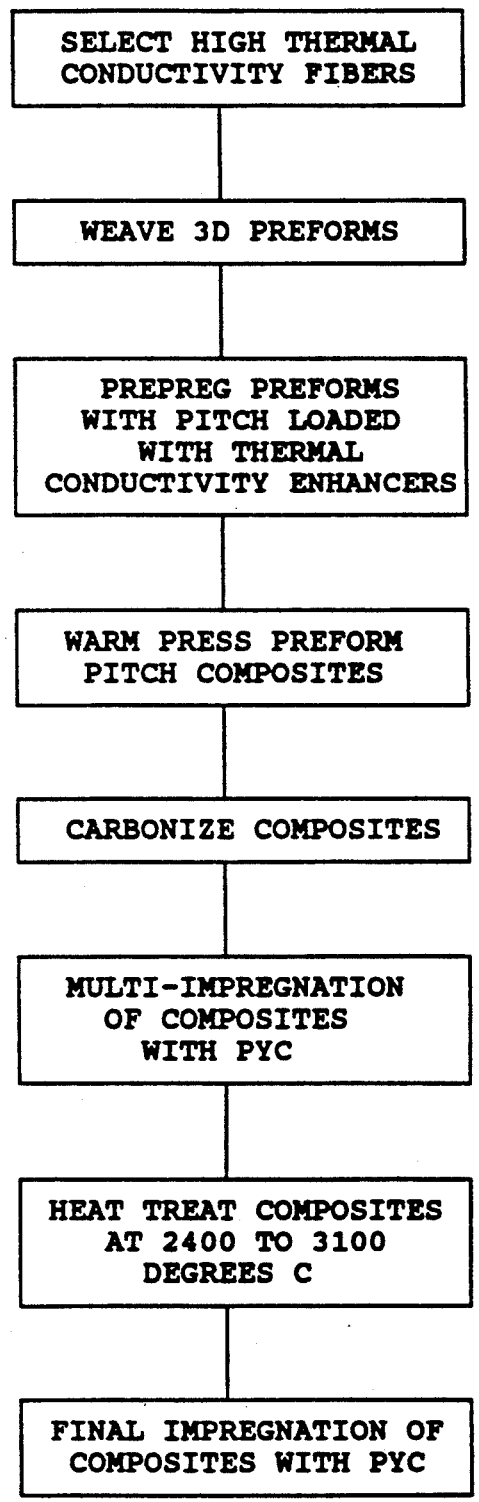
Figure 11:
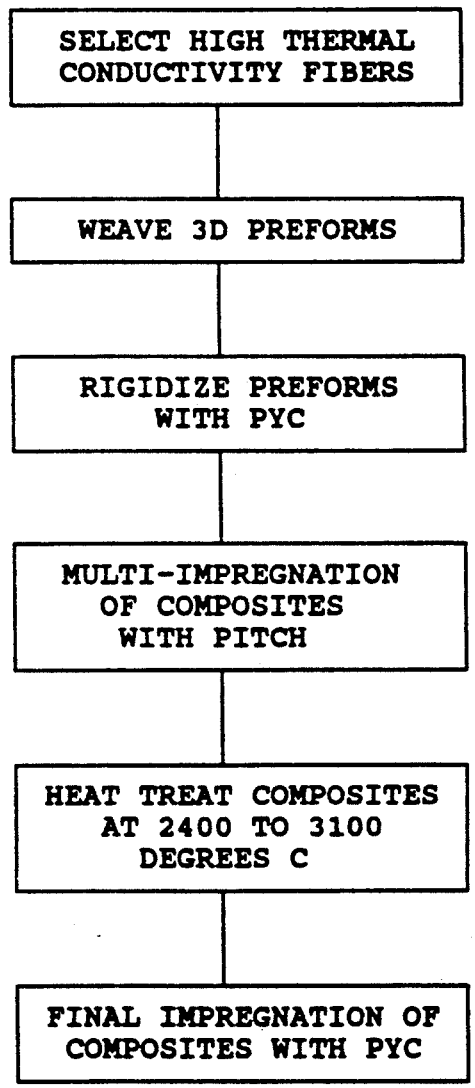
Figure 12:
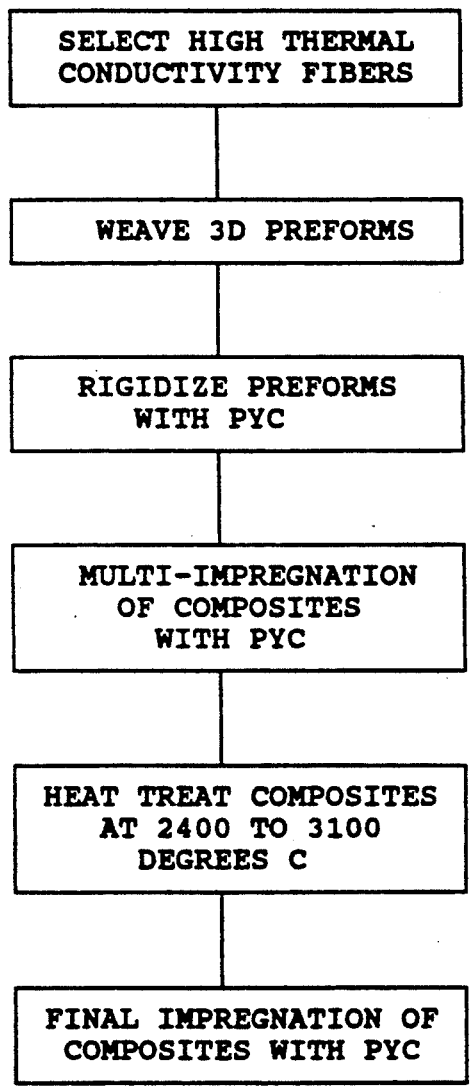
Figure 13:
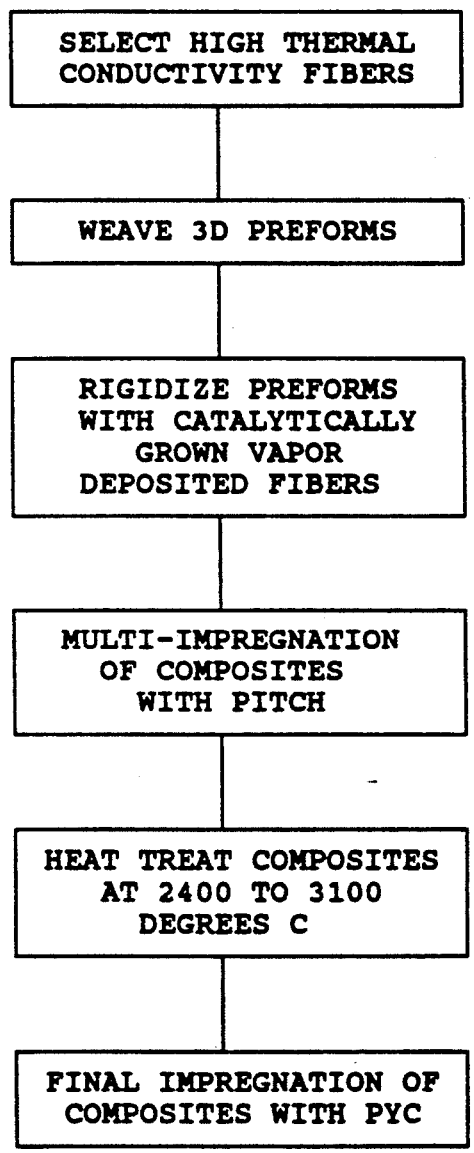
Figure 14:
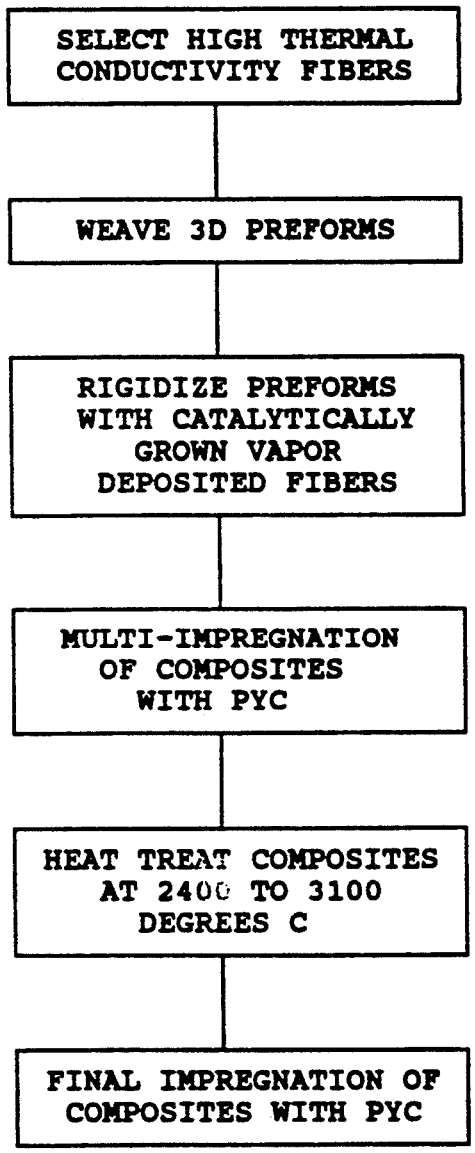

I have described below the process used by me to produce improved carbon-carbon composites that have combined high-strength, high-modulus and high thermal and electrical conductivity. I first describe the preferred processes for making 2D composites (these were formed by several layers of cloth) and then describe the preferred processes for producing 3D composites (these were produced using a woven 3D preform).

2D COMPOSITES

MAKING THE GREEN COMPOSITES

Carbon fibers derived from mesophase pitch such as those designated as a "P" series and "K" series from Amoco Performance Products, Inc. which have elastic moduli in the range 25 to 140 Msi and thermal conductivity in the range 50 to 1100 W/m K were woven into a 2D cloth. The 2D cloths were preferable woven either as a plain weave or as a 3 to 8 harness satin weave. The cloth may be woven as balanced or as unbalanced up to 5 to 1 warp to fill.

The 2D cloth is cut into swatches of suitable sizes for further processing. One swatch was placed onto the platen of a hot press and prepegged by sprinkling a fine pitch powder on the surface of each swatch. The pitch may be a petroleum pitch, a coal tar pitch or a mesophase pitch derived from either of the former. Either intermediate or high char yield pitches may be used.

Alternate layers of the cloth swatches were built up by sprinkling the swatches with pitches that contain either thermal conductivity enhancers or without enhancers. Each swatch was added to the stack in approximately equal increments of weight until the stack has a thickness in the range 0.030" to 0.500". These green laminate composites contain between 4 to 32 plies of cloth swatches.

PRESSING THE GREEN COMPOSITES

The green composites described above were pressed in the range 70 to 100 psi on a hydraulic press at a temperature about 17° C. above the softening point of the pitch that was used as a binder for about one (1) hour. The green composites were cooled under pressure for about 30 minutes. Excess pitch was trimmed from each composite after removal from the press.

CARBONIZING THE COMPOSITES

The pressed composites were restrained firmly with graphite plates secured by graphite bolts when petroleum or coal-tar pitches were used. This was done to prevent distortion, puffing or reduction in fiber volume during carbonization. A non-carbonizing "graphfoil" and E glass fabric ply is placed between the panels or disks and the graphite fixture plates to minimize adherence of the panels or disks to the graphite fixtures. The restrained parts were placed in saggers and covered with sand. The saggers were placed in a furnace, a vacuum drawn, and the chamber purged with an inert gas such as argon, helium or nitrogen. The composites were slowly heated to 500° C. in 75 hours to carbonize the pitch binder. The panels were heated to 900° C. without the graphite fixtures. Fiber volumes of 25 to 55 percent were obtained.

IMPREGNATION PROCESSES

Impregnation was carried out by one of two processes: (1) impregnation with a liquid pitch which was decomposed during a carbonization process to form matrix carbon or by (2) infiltration at a low pressure with a hydrocarbon gas such as methane or natural gas which was decomposed within the pores of the composite to from pyrolytic carbon.

Coal Tar or Petroleum Pitches

The carbonized composites were placed in the bottom of a suitable ceramic container, and the container placed in a suitable autoclave. The composites were then immersed in an impregnating pitch such as Ashland Oil Company's A-240, a high char yield derivative of A-240 or a mesophase pitch. The autoclave was evacuated and gradually heated to 200° C. The autoclave was pressurized to 15 psi with nitrogen, a vacuum was drawn and the nitrogen pressure reapplied to 15 psi. This cycle is repeated twice. The autoclave was cooled under pressure and the composites removed from the ceramic crucible and the composites removed from the hardened pitch. The composites were heat treated to 790° C. to carbonize the impregnated pitch. This pitch impregnation process, including the carbonization at 790° C., can be repeated up to four times depending on the final density desired and the application.

Pyrolytic Carbon

The composites were placed in a high temperature furnace, a vacuum of from 10 to 150 torr (preferably about 50 torr) was drawn and the composites heated to a temperature in the range 900° to 1500° C. If the temperature gets below 900° C. the process is too slow and soot may be formed. If the temperature gets above 1500° C. the deposition rate gets too fast and the deposited carbon tends to coat the surface of the composites rather than infiltrate the pores. The preferred temperature is near 1050° C. The open pores of the composites were infiltrated by a suitable hydrocarbon gas such as methane or natural gas, the gas was pyrolyzed and pyrolytic carbon was deposited on the pore walls. Constant infiltration is carried out for approximately 150 hours. The composites may be impregnated once or several times. Impregnation could be improved by light machining of the surfaces after each impregnation to unpack surface pores and permit better penetration of the hydrocarbon gas during subsequent infiltrations.

The composites can be removed after one, two or three impregnation cycles if the composites have acquired a density required for the application intended.

HEAT TREATMENT OF THE COMPOSITES

The impregnated composites were heated as rapidly as possible within limits of the furnace in an inert atmosphere to a temperature preferably in the range 2500° to 3100° C. and preferably held at the selected temperature for a period of from 0.5 to 2.0 hours. The composites were then cooled in the inert atmosphere to room temperature.

FINAL DENSIFICATION WITH PYROLYTIC CARBON

The composites were placed in a high temperature furnace, a vacuum of from 10 to 150 torr (preferably about 50 torr) was drawn and the composites heated to a temperature in the range 900° to 1500° C. The preferred temperature is near 1050° C. The open pores of the composites were infiltrated by a suitable hydrocarbon gas such as methane or natural gas, the gas was pyrolyzed and pyrolytic carbon was deposited on the pore walls. Constant infiltration was carried out for approximately 150 hours.

EXPLANATION

It was the heat treatment of the composites to temperatures in the range 2500° to 3100° C. which graphitizes the mesophase-pitch derived continuous precursor fibers and the matrix carbon that imparts high thermal and electrical conductivity to these composites. However, the heat treatment reduced the strength of the composites. The strength was restored by further densification with pyrolytic carbon. The final densification with pyrolytic carbon also further increases the thermal conductivity of the composites. The high modulus of the composites results from the high modulus of the mesophase derived carbon fibers that is developed during the in. situ. heat treatment. Note that it is important that the composites not be heated above 2500° C. after the final densification with pyrolytic carbon.

3D WOVEN STRUCTURES

The above described the selection of materials and processing for 2D laminate carbon-carbon composites. These materials and processing may be used to fabricate 3D woven or multi-D woven carbon-carbon composites that have high-strength, high-modulus and high thermal and electrical conductivity. The materials and processing were essentially the same as those described above with the following exceptions:
1. The fibers were woven into a suitable 3D or multi-D preform or as a braided cloth or tube.
2. Impregnation with pitch or densification with pyrolytic carbon can commence on the dry preforms or the dry preforms can be rigidized by infiltration with a hydrocarbon gas that deposits pyrolytic carbon in the pores. If rigidizing is practiced the dry preforms are only held in the furnace for about 50 to 150 hours.

USE OF HIGH-MODULUS/HIGH THERMAL CONDUCTIVITY FIBER PRECURSORS

The 3D preforms cannot be easily woven with fibers much above 50 to 60 Msi moduli, therefore, pyrolyzed or carbonized precursors of the "P" or "K" series fibers which were processed to moduli in the range 25 to 50 Msi were used to weave 3D angle interlock architectures or can be used to weave other 3D architectures that require the fibers to be bent at sharp angles. The use of these lower moduli fiber precursors allows ease of weaving into complex 3D preforms and also provides fiber that will develop high thermal conductivity in the range 500 to 1100 W/m.K upon further heating in the range 2500° to 3100° C. in. situ. within the composites. Thus this improvement not only makes it possible to form complex 3D composites with the graphitizible fibers, but also provides the potential for lower cost fibers in both 2D and 3D composites by eliminating a costly heat treatment step that is usually done prior to incorporation into composites. The low modulus precursor fibers were heated concurrently within the matrix carbon within the composites which produced, with one heat treatment high thermal conductivity in both the fibers and the matrix carbon.

ADDING THERMAL CONDUCTIVITY ENHANCERS TO THE MATRIX CARBON

Thermal conductivity enhancers in the form of fine particles were added to the pitch during prepregging to improve the thermal conductivity of the composites in the x, y and z directions.

Finely divided vapor grown fibers that develop thermal conductivities up to 2200 W/m.K, when heated in the range 2500° to 3100° C., were added to the prepreg pitch. Alternately highly conducting polycrystalline graphite particles or natural flake graphite particles were added in the same manner as the vapor grown fibers.

CATALYTICALLY GROWING VAPOR DEPOSITED FIBERS WITHIN THE COMPOSITES

Another way to incorporate vapor grown fibers into the matrix carbon of the composites was to spread finely divided metallic particles, such as iron, nickel, silicon or other catalysts that are known to promote the growth of carbon fibers during chemical vapor deposition of carbon. The catalyzed preforms were then draped in a suitable furnace and the matrix fibers grown by flowing a suitable hydrocarbon gas through the preform and decomposing it at reduced pressures in the range 900° to 1500° C.

The above described formation of 2D green composites was also applied to 3D angle interlock preforms, except the 3D preforms were woven directly and not laid up from 2D cloth swatches. The 3D preforms were formed directly with the "P" and "K" fiber precursor fibers. The thermal conductivity enhancers were added directly to the 3D preforms in a slurry or paste consisting of the thermal conductivity enhancer particles in A-240 pitch thinned with a mixture of toluene and tetrahydrofuran. The enhancers were held inside the composites by sealing the surfaces with rubber cement prior to carbonization. The rubber cement vaporized during carbonization. Catalytically grown matrix fibers are implanted in the 3D preforms in the same manner as those described for the 2D composites.

USE OF MESOPHASE PITCH FOR PREPREGGING OR IMPREGNATING

Good results were also obtained using mesophase pitch instead of regular petroleum or coal tar pitch. The green composites were preferably heated in air at approximately 220° C. for about ten (10) hours to stabilize the pitch against distortion during the carbonization process. Restraint of the green composites is not required in such a process.

TEST RESULTS

The following is an example of the properties that have been achieved and those that are expected to be achieved by practicing the improvements described in the preferred embodiment:

TABLE 1

| Properties | Achieved | | Expected With Improvements | |
|---|---|---|---|---|
| | 2D | 3D | 2D | 3D |
| Density, g/cc | 1.80 | 1.54 | 1.90 | 1.65 |
| Thermal Conductivity, W/m · K | | | | |
| In-plane | 412 | 134 | 600 | 300 |
| Cross-Plane | 50 | 82 | 50 | 200 |
| Thermal Expansivity, (alpha × 10$^{-6}$ °C.$^{-1}$) | | | | |
| In-Plane | 0.50 | NM | 0.50 | NM |
| Cross-Plane | 13.5 | NM | 13.5 | NM |
| Electrical Resistivity (Micro-ohm cm) | | | | |
| In-Plane | 400 | NM | 280 | NM |
| Cross-Plane | 1330 | NM | 1330 | NM |
| Tensile (In-Plane) | | | | |
| Strength, Ksi | 70 | 15 | 70 | 25 |
| Modulus, Msi | 57 | 9 | 57 | 15 |
| Edge Compression Strength, Ksi | 17 | NM | 25 | NM |
| Cross-Ply Tensile Strength, Psi | 680 | NM | 800 | NM |
| Interlaminar Shear Strength, Ksi | 3.9 | 1.6 | 4.0 | 2.0 |

NM: Not measured

While the above description contains many specificities, the reader should not construe these as limitations, but merely as exemplifications of preferred embodiments thereof. Those skilled in the art will envision that many other possible variations are within its scope. Accordingly the reader is requested to determine the scope of the invention by the appended claims and their legal equivalents, and not by the examples which have been given.

What is claimed is:

1. A method for fabricating a high-strength, high-modulus and high thermal and electrical conducting 2D laminate carbon-carbon composite comprising the steps of:
   a. forming a green laminate composite comprising:
      (1) graphitizible carbon cloth plies,
      (2) fine graphitizible pitch powder; said cloth plies comprising mesophase derived pitch fiber tow with moduli in a range of 25 to 140 Msi, and
      (3) thermal conductivity enhancers,
   b. heating the green laminate composite to a temperature high enough to cause the pitch powder to soften and pressing the composite to form a pressed green laminate composite comprised of graphitizible carbon cloth, pitch matrix and thermal conductivity enhancers,
   c. heating the pressed green composite to at least 500° C. to:
      (1) carbonize the pitch,
      (2) form a carbon matrix and
      (3) shrink and crack the matrix carbon,
   d. impregnating the composite with additional graphitizible pitch by covering the composite with the pitch and heating the covered composite to at least 200° C. to melt the pitch and permit it to flow into the composite and then increasing the pressure to at least 15 Psi,
   e. heating the composites to at least 900° C.,
   f. repeating steps d and e at least once,
   g. heating the composite to between 2400° to 3100° C. to graphitize the fibers and the pitch matrix carbon in the composites to produce a graphitized composite having cracks and pores, and
   h. reimpregnating the graphitized composites by infiltrating the cracks and pores of the composites with a hydrocarbon gas at a temperature in the range 982° to 1490° C. and depositing pyrolytic carbon in the pores and cracks.

2. A method as in claim 1 wherein said thermal conductivity enhancers comprise vapor grown fibers.

3. A method as in claim 1 wherein said thermal conductivity enhancers comprise graphite particles.

4. A method as in claim 3 wherein said graphite particles comprise natural flake graphite particles.

5. A method as in claim 3 wherein said graphite particles comprise polycrystalline graphite particles.

6. A method for fabricating a high-strength, high-modulus and high thermal conductivity and high electrical conductivity 2D laminate carbon-carbon composite comprising the steps of:
   a. forming a green laminate composite comprising:
      (1) graphitizible carbon cloth plies and
      (2) fine graphitizible pitch powder; said cloth plies comprising mesophase derived pitch fiber tow with moduli in a range of 25 to 140 Msi,
   b. heating the green laminate composite to a temperature high enough to cause the pitch powder to soften and pressing the composite to form a pressed green laminate composite comprised of graphitizible carbon cloth and pitch matrix,
   c. heating the pressed green laminate composite to at least 500° C. to:
      (1) carbonize the pitch,
      (2) form a carbon matrix and,
      (3) shrink and crack the carbon matrix,
   d. impregnating the composite by infiltrating the cracks, and pores of the composite with a hydrocarbon gas at a temperature in the range of 900° to 1500° C. and depositing pyrolytic carbon in the pores and cracks e. heating the composite to at least 900° C., f. repeating steps d and e at least once, g. heating the composite to between 2400° to 3100° C. to graphitize the fibers and the matrix carbon in the composite to produce a graphitized composite having cracks and pores and, h. impregnating the graphitized composite by infiltrating the cracks and pores of the composite with a hydrocarbon gas at a temperature in the range of 900° to 1500° C. and depositing pyrolytic carbon in the cracks and pores.

7. A method as in claim 6 wherein the hydrocarbon gas used in step d is natural gas and the temperature range is 900° to 1500° C.

8. A method for fabricating a high-strength, high-modulus and high thermal conductivity and high electrical conductivity 2D laminate carbon-carbon composite comprising the steps of:

a. forming a laminate composite by,
  (1) making a plurality of cloth plies comprised of mesophase derived pitch fiber tow with moduli in a range of 25 to 140 Msi,
  (2) making a preform comprised of layers of said cloth plies and catalytic particles for the promotion of the growth of chemical vapor deposited carbon fibers,
  (3) placing the particle-filled preforms in a furnace and flowing a suitable hydrocarbon gas through the preform at a reduced pressure and in a temperature range of 900° to 1500° C., b. impregnating the rigidized composite with additional graphitizible pitch by covering the composite with pitch at a temperature of at least 200° C. and applying pressure of at least 15 Psi, c. heating the composite to at least 900° C., d. repeating steps b and c at least once, e. heating the composite to between 2400° to 3100° C. to graphitize the fibers and the matrix carbon in the composite to produce a graphitized composite and, f. impregnating the graphitized composite by infiltrating cracks and pores of the composite with a hydrocarbon gas at a temperature in the range of 900° to 1500° C. and depositing pyrolytic carbon in the cracks and pores.

9. A method as in claim 8 wherein said catalytic particles comprise finely divided metal particles.

10. A method as in claim 8 wherein said catalytic particles are selected from the group consisting of iron, nickel and silicon particles.

11. A method as in claim 8 wherein said temperature in step a(3) is about 1050° C.

12. A method for fabricating a high-strength, high-modulus and high thermal conductivity and high electrical conductivity 3 D carbon-carbon composite comprising the steps of:

a. forming a composite by,
  (1) weaving a plurality of fibers comprised of mesophase derived pitch fiber tow with moduli in a range of 25 to 140 Msi into a 3 D preform,
  (2) adding catalytic particles to the preform for the promotion of the growth of chemical vapor deposited carbon fibers,
  (3) placing the particle-filled preform in a furnace and flowing a suitable hydrocarbon gas through the preform at a reduced pressure and in a temperature range of 900° to 1500° C., b. impregnating the rigidized composite with graphitizible pitch by covering the composite with pitch at a temperature of at least 200° C. and applying pressure of at least 15 Psi, c. heating the composite to at least 900° C., d. repeating steps b and c at least once, e. heating the composite to between 2400° to 3100° C. to graphitize the fibers and the matrix carbon in the composite to produce a graphitized composite and, f. impregnating the graphitized composite by infiltrating cracks and pores of the composite with a hydrocarbon gas at a temperature in the range of 900° to 1500° C. and depositing pyrolytic carbon in the cracks and pores.

13. A method as in claim 12 wherein said catalytic particles comprise finely divided metal particles.

14. A method as in claim 12 wherein said catalytic particles are selected from a group consisting of iron, nickel and silicon particles.

15. A method as in claim 12 wherein said preferred temperature in step a(3) is about 1050° C.

16. A method as in claim 8, wherein said suitable hydrocarbon gas is natural gas.

17. A method as in claim 12, wherein said suitable hydrocarbon gas is natural gas.

18. A method as in claim 8 wherein thermal conductivity enhancers are included in the formation of said green composite preforms.

19. A method for fabricating a high-strength, high-modulus and high thermal conductivity and high electrical conductivity carbon-carbon composite comprising the steps of:

a. forming a preform of carbon fibers woven in more than two dimensions, b. rigidizing said preform by infiltrating with pyrolytic carbon to form a rigid composite, c. impregnating the composite with pitch by covering the composite with graphitizible pitch and heating the covered composites to at least 200 C. to melt the pitch and permitting it to flow into the composites under a pressure of at least 15 psi, d. heating said composite to at least 500 C. to carbonize the pitch to form matrix carbon and then heating further to at least 900 C. to shrink and crack the matrix carbon to produce cracks and pores, e. repeating steps c and d at least once, f. heating the composites to between 2400 to 3100 C. to graphitize the fibers and the pitch matrix carbon in the composite to produce a graphitized composite with additional cracks and pores, and g. reimpregnating said graphitized composite by infiltrating the cracks and pores of the composite with a hydrocarbon gas and depositing pyrolytic carbon in the cracks and pores.

20. A method for fabricating a high-strength, high-modulus and high thermal conductivity and high electrical conductivity carbon-carbon composite comprising the steps of:

a. forming a preform of carbon fibers woven in more than two dimensions, b. rigidizing said preform by infiltrating with pyrolytic carbon to form a rigid composite, c. impregnating the composite by infiltrating it with a hydrocarbon gas at a temperature in the range of 900 C. to 1500 C. and depositing pyrolytic carbon in the composite, d. heating said composite to at least 900 C. to produce cracks and pores, e. repeat steps c and d at least once f. heating the composites to between 2400 to 3100 C. to graphitize the fibers and the matrix carbon in the composite to produce a graphitized composite with additional cracks and pores, and g. reimpregnating said graphitized composite by infiltrating the cracks and pores of the composite with a hydrocarbon gas and depositing pyrolytic carbon in the cracks and pores.

21. A method for fabricating a high-strength, high-modulus and high thermal conductivity and high electrical conductivity carbon-carbon composite comprising the steps of:

a. forming a multidimensional green composite comprising:
   1) a preform comprised of graphitizable carbon fiber woven in more than two dimensions and
   2) fine graphitizible pitch powder, b. heating the multidimensional green composite to a temperature high enough to cause the pitch powder to soften and pressing the composite to form a pressed green multidimensional composite comprised of graphitizible carbon fibers and pitch matrix, c. heating the pressed green composite to at least 500 C. to:
   1) carbonize the pitch,
   2) form a carbon matrix and
   3) shrink and crack the carbon matrix, d. impregnating the composite with pitch by covering the composite with graphitizible pitch and heating the covered composites to at least 200 C. to melt the pitch and permitting it to flow into the composites under a pressure of at least 15 psi, e. heating said composite to at least 500 C. to carbonize the pitch to form matrix carbon and then heating further to at least 900 C. to shrink and crack the matrix carbon to produce cracks and pores, f. repeating steps d and e at least once, g. heating the composites to between 2400 to 3100 C. to graphitize the fibers and the pitch matrix carbon in the composite to produce a graphitized composite with additional cracks and pores, and h. reimpregnating said graphitized composite by infiltrating the cracks and pores of the composite with a hydrocarbon gas and depositing pyrolytic carbon in the cracks and pores.

22. A method for fabricating a high-strength, high-modulus and high thermal conductivity and high electrical conductivity carbon-carbon composite comprising the steps of:

a. forming a multidimensional green composite comprising:
   1) a preform comprised of graphitizable carbon fiber woven in more than two dimensions and
   2) fine graphitizible pitch powder, b. heating the multidimensional green composite to a temperature high enough to cause the pitch powder to soften and pressing the composite to form a pressed green multidimensional composite comprised of graphitizible carbon fibers and pitch matrix, c. heating the pressed green composite to at least 500 C. to:
   1) carbonize the pitch,
   2) form a carbon matrix and
   3) shrink and crack the carbon matrix, d. impregnating the composite by infiltrating it with a hydrocarbon gas at a temperature in the range of 900 C. to 1500 C. and depositing pyrolytic carbon in the composite, e. heating said composite to at least 900 C. to produce cracks and pores, f. repeat steps d and e at least once, g. heating the composites to between 2400 to 3100 C. to graphitize the fibers and the matrix carbon in the composite to produce a graphitized composite with additional cracks and pores, and h. reimpregnating said graphitized composite by infiltrating the cracks and pores of the composite with a hydrocarbon gas and depositing pyrolytic carbon in the cracks and pores.

* * * * *